United States Patent
Milnikel

[19]

[11] Patent Number: 5,596,238
[45] Date of Patent: Jan. 21, 1997

[54] MAGNET ATTACHMENT ASSEMBLY FOR A MAGNETIC CLUTCH

[75] Inventor: Siegfried Milnikel, Krefeld, Germany

[73] Assignee: ITT Richter Chemie-Technik GmbH, Kempen, Germany

[21] Appl. No.: 374,497

[22] Filed: Jan. 18, 1995

[30] Foreign Application Priority Data

Jan. 18, 1994 [DE] Germany ............... 44 01 241.1

[51] Int. Cl.⁶ .......... H02K 49/00; H02K 15/00; H02K 21/22; H02K 21/12
[52] U.S. Cl. ............ 310/103; 310/42; 310/156; 310/104
[58] Field of Search ............... 310/103–105, 310/153, 156, 42

[56] References Cited

U.S. PATENT DOCUMENTS

| | | | |
|---|---|---|---|
| 4,115,040 | 9/1978 | Knorr | 417/420 |
| 4,115,716 | 3/1991 | Ogasawala et al. | 310/153 |
| 4,197,474 | 4/1980 | Honigsbaum | 310/104 |
| 4,877,986 | 2/1993 | Shimizu et al. | 310/153 |
| 5,111,094 | 11/1991 | Patel et al. | 310/156 |

FOREIGN PATENT DOCUMENTS

3636405A1  4/1988  Germany .

*Primary Examiner*—Thomas M. Dougherty
*Assistant Examiner*—Michael Wallace, Jr.
*Attorney, Agent, or Firm*—Herbert Dubno

[57] ABSTRACT

The invention relates to a retaining means for magnets of magnetic clutch for pump drives and has an outer rotor receiving magnets on its inner side and an inner rotor receiving magnets on its outer side, the magnets being disposed evenly around the periphery of the rotors, while disposed coaxially of both sides of the magnets are thin annular disks having a number of straps which partially engage over the magnets on the side remote from the rotor, at least one strap engaging over one magnet in each case.

12 Claims, 8 Drawing Sheets

MAGNET ATTACHMENT ASSEMBLY FOR A MAGNETIC CLUTCH

FIELD OF THE INVENTION

My present invention relates to a retaining assembly for magnets of a magnetic clutch of a pump drive, the magnetic clutch having an outer rotor receiving magnets on its inner side and an inner rotor receiving magnets on its outer side.

BACKGROUND OF THE INVENTION

Nowadays magnetic clutches are used in pump drives in which a can separates an outer rotor and an inner rotor from one another. The outer rotor, driven by a motor and equipped with magnets, drives the inner rotor, also equipped with magnets, by the magnetic field generated by the magnets.

In the past, the magnets of both rotors have been retained in position by gluing or by another positive connection to the rotors. The attachment of the magnets is required to prevent the magnets from being released from the rotor by centrifugal force in the case of the inner rotor, and to prevent the slipping or sliding of the magnets in the case of the outer rotor.

The patent literature discloses a large number of methods of anchoring magnets reliably on rotors. For example, German Patent Document 6,641,165 discloses a magnet cage for small dynamos in which the magnet bars are regularly spaced around the armature axis parallel therewith, each of the magnet bars having on its back a flat or rounded bead interrupted at each edge by a ground-in channel extending as far as the back of the magnet. The resulting lug or bead formed at the magnet bar end engages in a recess of the cap, thus retaining the magnet bars firmly in the radial and axial directions. This construction has the disadvantage of requiring a relatively large amount of fabrication equipment, since the magnet bars must be specially shaped and ground and tolerances must be observed.

British Patent Specification 2,052,319 also discloses an attachment of magnets to a rotor. To this end the rotor is formed with recesses into which the rectangular magnets are inserted. Then a member is fitted around the rotor and the magnet and bent over, said member engaging by its ends around the inner side of the rotor and thereby preventing the magnets from being lost in the radial direction. This construction has the disadvantage that there is a relatively large radial distance between the surface of the magnet and the surface of the member engaging around the rotor, so that the outer effect of the magnet is reduced. Moreover, filling members are needed and a considerable accuracy of fit is required, since the filling members and the magnets might otherwise be either unmountable or would knock backwards and forwards in the rotor and therefore wear more rapidly. It is also impossible to jacket the magnets with plastic, since no openings or channels are provided for the injection of the liquid plastic.

French Patent 1,162,656 also discloses a system for radially securing the magnets of a rotor. In this case also a ring encloses the rotor. To prevent the dislodging of the magnets by the centrifugal forces, this French Patent suggests that the wall thickness of the circular ring should be so increased in the zone of the magnets that they bear via their surfaces firmly against the inner side of the ring in the radial direction. It calls for a very elaborate manufacturing technology and it is disproportionately expensive to make such a ring.

A further possibility is to cement the magnets in matching recesses in the rotors. However, such gluing requires extensive preparational and cleaning work and is also a manufacturing step which cannot be automated. Moreover, in dependence on centrifugal force loading, the glued connection is not reliable in the case of the inner magnet rotor and is also not completely resistant to temperature and chemicals. For this reason magnets should be glued in rotors only in exceptional cases.

Since for reasons of protection (e.g. against corrosion) the inner magnet rotor of magnetic clutch in magnetic clutch pumps should be jacketed with plastic, since it is surrounded by the medium to be conveyed, the glued connection must also survive the plastic processing operation with its high thermal and mechanical loading, something which usually results in a thermal overloading of glue, especially in the case of plastics resistant to high temperatures.

Positive connections of the magnet to the rotor are moreover as a rule very expensive, since the magnets can then be produced only with the use of special tools or their shape must be correspondingly ground.

OBJECTS OF THE INVENTION

It is therefore an object of the invention to provide a simple retaining means for magnets on an inner and an outer rotor such that the magnets are retained by a reduced number of simply manufacturable members unshiftably on the rotors, even during their jacketing with plastics.

Another object of the invention is to provide an improved mounting assembly for magnets in a pump clutch system of the type described whereby drawbacks of earlier arrangements are obviated.

SUMMARY OF THE INVENTION

These objects are achieved according to the invention by disposing coaxially on both sides of the magnet thin annular disks having a number of straps which partially engage over the magnets on the side remote from the rotor, at least one strap engaging over each magnet in each case.

The advantage of the invention is that it uses coaxial annular disks for the retention of the magnets on the inner and outer rotors. The coaxial annular disks retain the magnets positively on the surfaces provided for the magnets on the rotors, so that the forcing-in of plastic (injection molding of the synthetic resin onto the magnet assemblies) does not change the position of the magnets. The rings are also secure against rotation on or in the rotor. This always ensures that the magnets bearing against the rotor in the peripheral direction are reliably retained. Such a retaining means is extremely compact and readily mountable, the result being high operational reliability.

In one particularly simple and readily mountable construction of the retaining means, each of the magnets disposed in the radial direction of rotation on the outer and inner rotors respectively are laterally clamped by at least one annular disk, and at least one lug of the annular disk bears against the side remote from the bearing face of each magnet, the lug retaining the magnet against the rotor.

The lateral clamping of the magnets by the annular disk fixes them in the axial direction. At the same time, the lugs engaging partially around the magnets retain them against the rotors. The centrifugal forces generated by the rotation of the inner rotor are absorbed by the lugs of the annular disks.

Preferably according to the invention two or more lugs engage around each magnet. Particularly advantageously in each case two coaxial annular disks bear oppositely against the magnet.

Advantageously the lug is so shaped, more particularly S-shaped and resilient, that the contact face of the lug presses the magnet elastically in the direction of the bearing face thereof. The pressurizing ensures that even during the injection of the plastic, the magnets always bear against the rotor and no plastic can penetrate between the magnets and the rotors.

Also advantageously the annular disk has projections which retain the magnets in position in the peripheral direction, and the outer periphery of the annular disk is formed with recesses which are disposed between the magnets. The plastic for jacketing the rotor can be injected through the recesses between the magnets on the outer periphery. This feature also ensures that the plastic can be distributed around the magnets and fill the cavities therebetween. With suitably shaped and designed magnets the injected plastic jacketing so engages around the magnets that the magnets are retained by the plastic jacketing in both the axial and radial directions. Due to the use of the annular disks according to the invention, the axial length of the rotor is determined exclusively by the thickness of the annular disks and the dimensions of the magnets, so that the rotor can advantageously be relatively narrow, while at the same time a reduction in weight is achieved.

Particularly advantageously the annular disk is made from a nonmagnetic material. This prevents disturbances of the field lines of the magnets, the result being an improved magnetic coupling of the magnets of the inner and outer rotors.

Advantageously the dimensions of the lugs of the annular disk for the inner rotor are such that the corners of the magnets are at a larger radial distance from the rotor axis than the corners of the lugs. The outer periphery of the inner rotor is therefore determined by the dimensioning of the magnets, thus also enhancing the transmission power of the magnetic clutch.

Advantageously, to enable the annular disks to be attached to the inner and outer rotor respectively, the annular disk is formed with openings for the axial reception of screws or rivets for attachment to the inner and outer rotor respectively.

If any assembly faults occur, more particularly reversed polarities of the magnets used or faults in jacketing, the magnets and annular disks can be dismounted without destruction by the removal of the screws or rivets and reused after the fault has been eliminated.

With the use of two or more rows of magnets disposed in parallel in the radial peripheral direction, two annular disks bear against one another and have their lugs pointing away from one another are disposed between the rows of magnets. At the same time each of the two outer rows of magnets is flanked by an end annular disk, the rows of magnets being compressed and retained in position by the two end annular disks, the end annular disks being attached by means of screws or rivets to the inner and outer rotor respectively. This ensures that the magnets cannot become displaced in the axial direction during the injection of the plastic for the jacketing of the rotor. Since the magnets are disposed distributed symmetrically in the peripheral direction of the rotor, only one kind of annular disk is required to fix the rows of magnets.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
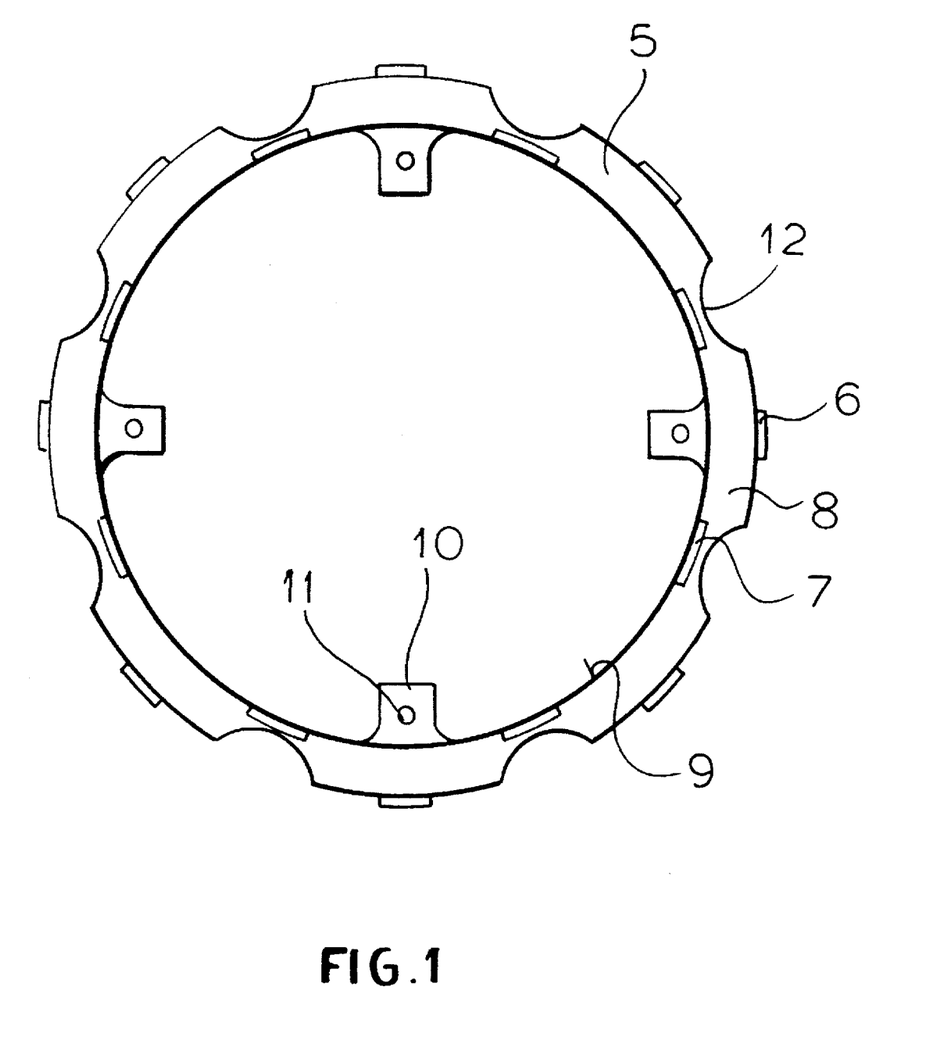
FIG. 1 is a plan view of an annular disk having for retaining purposes a lug for each magnet.
Figure 9:
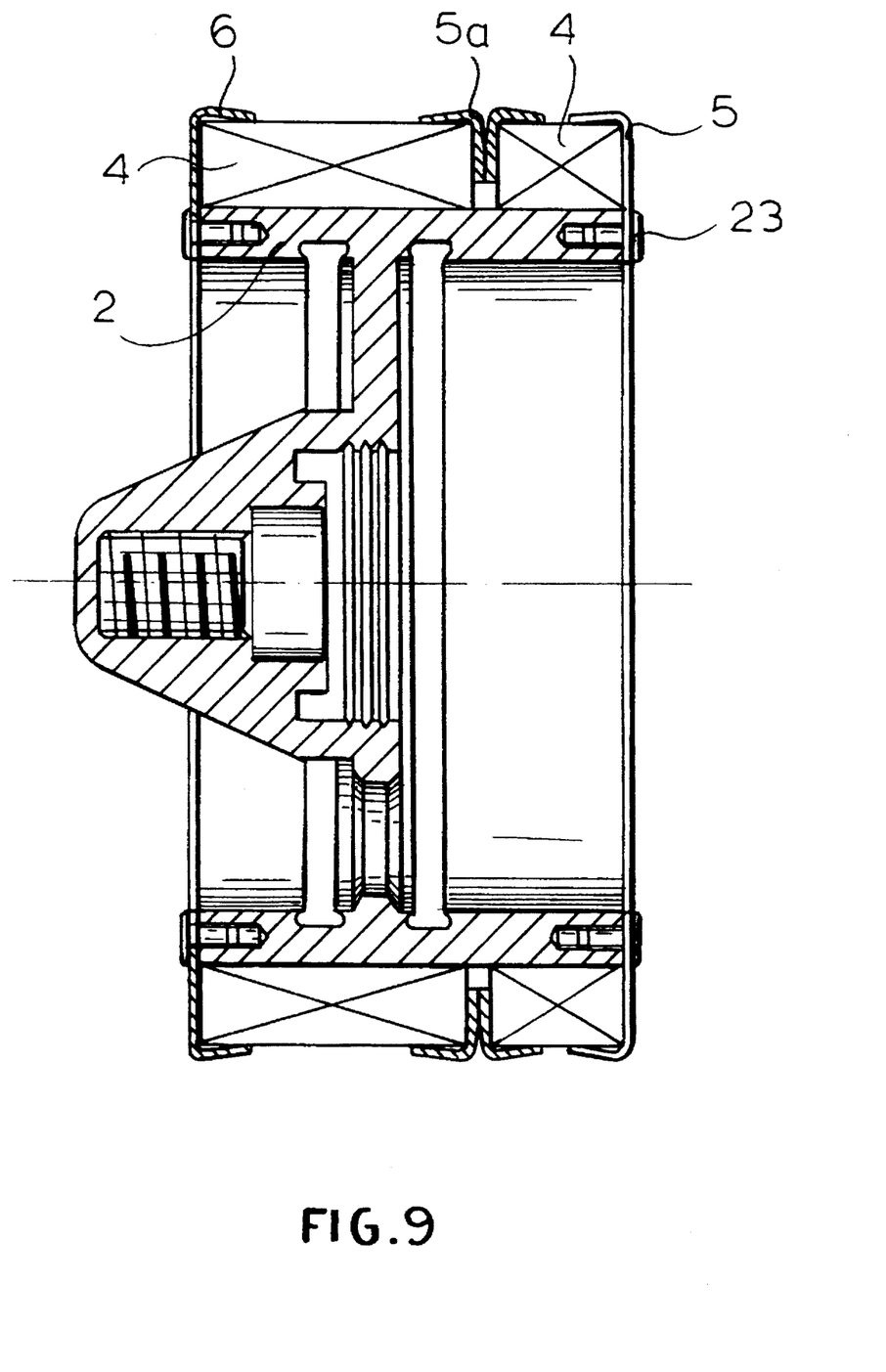
FIG. 9 is an axial cross-section of a rotor with two magnetic disks.

FIG. 1 shows an annular disk 5 for lateral attachment to an inner rotor 2 of the magnetic clutch. Distributed symmetrically on the outer edge are lugs 6 which are bent substantially parallel with the surface normal of the annular disk, so that they can engage over magnets 4 (FIGS. 2 and 3) bearing laterally against the annular disk. The annular disk also has projections 7 which also project from the annular disk 5 parallel with the surface normal thereof. The magnets 4 are disposed between the projections 7 and are retained thereby in the radial peripheral direction. The outer periphery of the annular disk 5 is also formed with recesses 12 of any shape between each of the lugs 6, via which plastic can be injected laterally between the magnets 4. The annular disk 5 has molded-on parts 10 having bores 11 through which the annular disk 5 is attached to the inner rotor 2 by means of screws or rivets 23 (FIG. 9).

Figure 2:
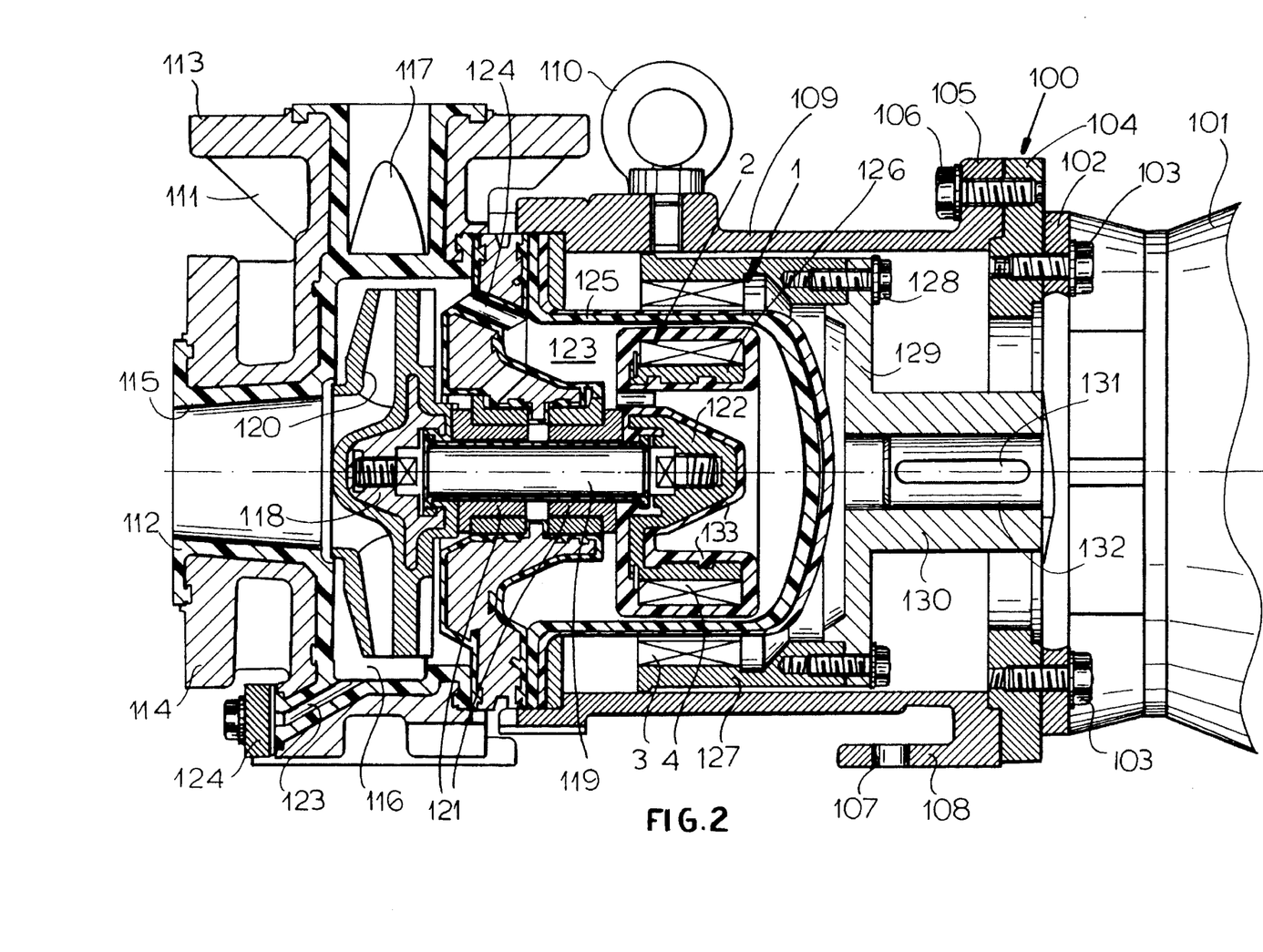
FIG. 2 is a cross-section of a canned pump with a magnetic clutch between the pump unit and the electric drive (not shown in detail)

FIG. 2 is a cross-section of a canned pump with magnetic clutch. Rows of magnets in the form of magnet packs 3 and 4 are shown disposed peripherally parallel with one another. The annular disks described hereinbefore are not shown in FIG. 2.

More particularly, the pump 100 shown in FIG. 2 can comprise an electric motor 101 whose base 102 is bolted at 103 to a flange 104 which, in turn, is connected to an outwardly extending flange 105 by the screws 106. The flange 105 can be provided with mounting feet 108 whose holes 107 can receive screws for mounting the pump on an appropriate base.

The flange 105 is formed unitarily on a clutch housing 109 formed with a lifting eye 110 and connected, in turn, to a body 111 of the pump which can be provided internally with a plastic lining 112 to prevent corrosion. The body 111 has flanges 113 and 114 for connection, respectively, to a delivery line receiving the pumped liquid and an intake line supplying the pumped liquid, neither line being shown.

An inlet 115 opens into a pumping chamber 116 whose pressure side or outlet is formed at 117, the liquid being misplaced by an impeller 118 keyed to a driven shaft 119 and provided with a plastic anticorrosion lining 120.

The shaft 119 is received, in turn, in bearings 121 and is keyed to the inner rotor body 122 of the inner rotor generally represented at 2.

The chamber 116 has a drain passage 123 closed by a plug 124 and the rotor body 122 is received in a chamber 123 which can be cooled by liquid circulated by the pump, e.g. through passages one of which is visible at 124. The chamber 123 is defined by a "can" 125 which can be lined with plastic internally and externally to limit corrosion or can be composed of plastic. The inner rotor 2 has a rim 126 upon which the inner magnet 4 are mounted, these magnets being held between disks of the type shown in FIG. 1. A suitable magnet array is that shown in FIG. 3.

The magnets 4 are coplanar with the magnets 3 of the outer rotor 1 which comprises a generally cylindrical body 12 bolted at 128 to a flange 129 of a driving member 130 keyed at 131 to the shaft 132 of the electric motor 101.

The inner rotor is provided with the plastic lining or jacket 133 as will be described in greater detail hereinafter.

The pump of FIG. 2 operates in the usual manner. When the motor 101 is energized, the magnets 3 entrain the magnets 4 to drive the impeller 118 and force liquid to flow into the port 115 and out through the port 117.

Figure 3:
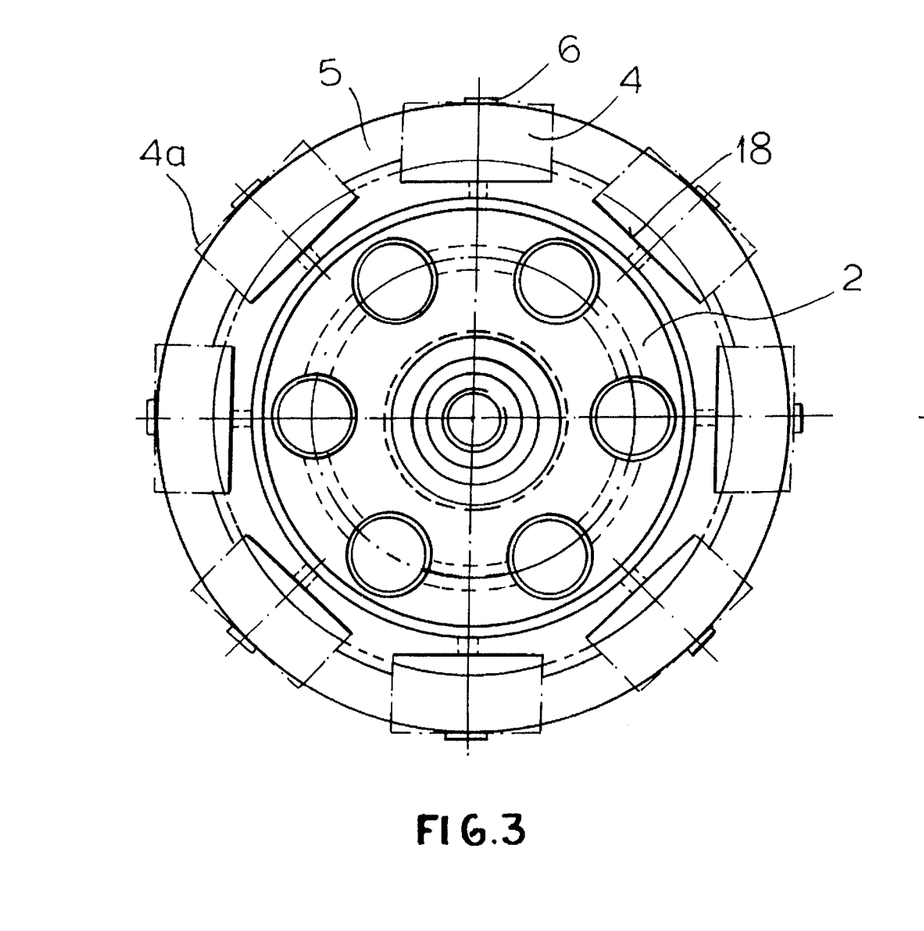
FIG. 3 is an elevational view showing an assembly according to the invention with a disk in place.
Figure 4:
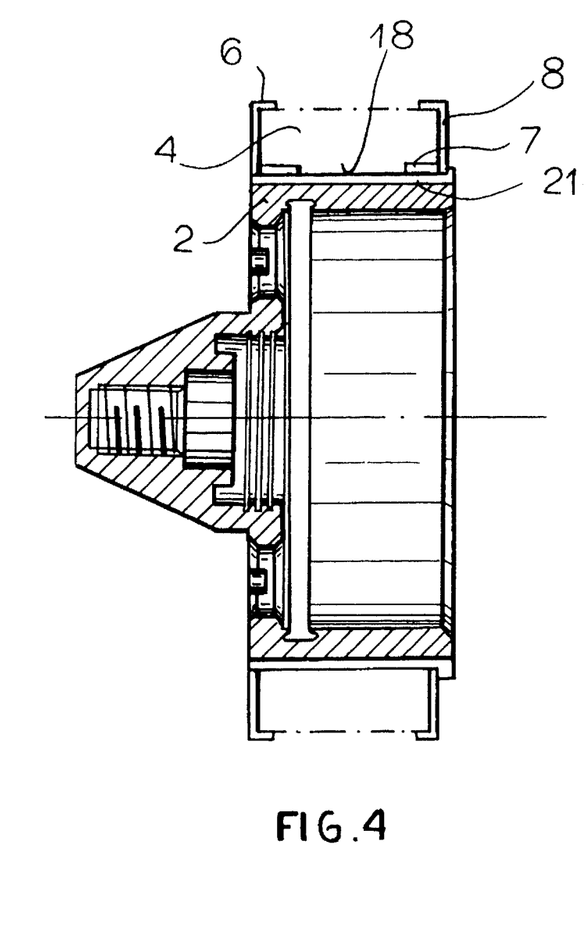
FIG. 4 is a cross-section of the inner rotor with magnets and annular disks.

FIGS. 3 and 4 show an inner rotor against whose outer periphery magnets 4 bear symmetrically, the magnets 4 being disposed in recesses 118 and being forced or retained against contact or bearing surfaces of the recesses 18 by the lugs 6 of the annular disks 5 slipped coaxially onto the inner rotor. The magnets 4 are retained in position in the axial direction by lateral faces 8 of the annular disks 5 and in the radial peripheral direction by the projections 7 of the annular disk 5. The magnets 4 are also retained securely in the radial direction by the lugs 6 of the annular disks 5 engaging over the magnets 4. To enable the magnets 4 and the annular disk 5 to be mounted separately from the rotor, use can be made of an annular sleeve 21 (FIG. 4) on which the magnets 4 and annular disks 5 are premounted, thereafter being slipped over the rotor. Corners 4a of the magnets 4 are at a greater distance from the axis of the inner rotor 2 than the lugs 6.

Figure 5A:
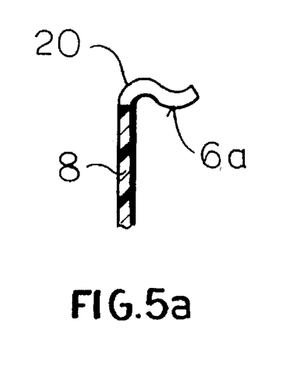
FIG. 5a is a cross section through a mounting disk showing a side elevation of an S-shaped bent lug.
Figure 5B:
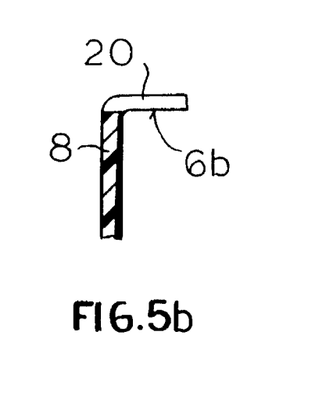
FIG. 5b is a view similar to FIG. 5a showing a side elevation of a flatly bent lug.
Figure 5C:
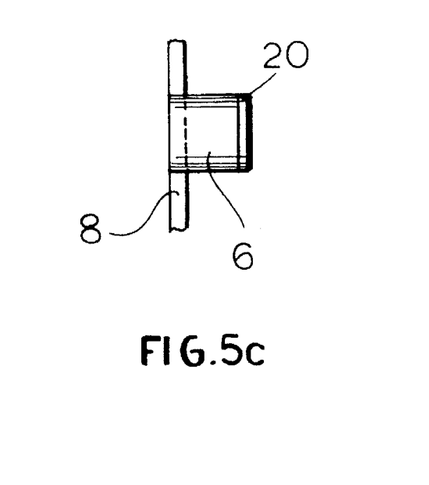
FIG. 5c is a plan view of a lug.

FIGS. 5a–5c shows possible embodiments of lugs 6. FIG. 5a shows an S-shaped bent lug 6 whose contact face 6a pressures against the magnets 3, 4. The lug 6 is so shaped that when the annular disk 5 is slipped on, the lugs 6 are forced radially outwards by the magnets 3, 4, the results being a springing effect. FIG. 5b shows spring lug which also engages over the magnets 4, but does not pressurize the magnets in the direction of the bearing face 18 (FIGS. 3 and 4). FIG. 5c is a plan view of a possible embodiment of the lug 6.

Figure 6:
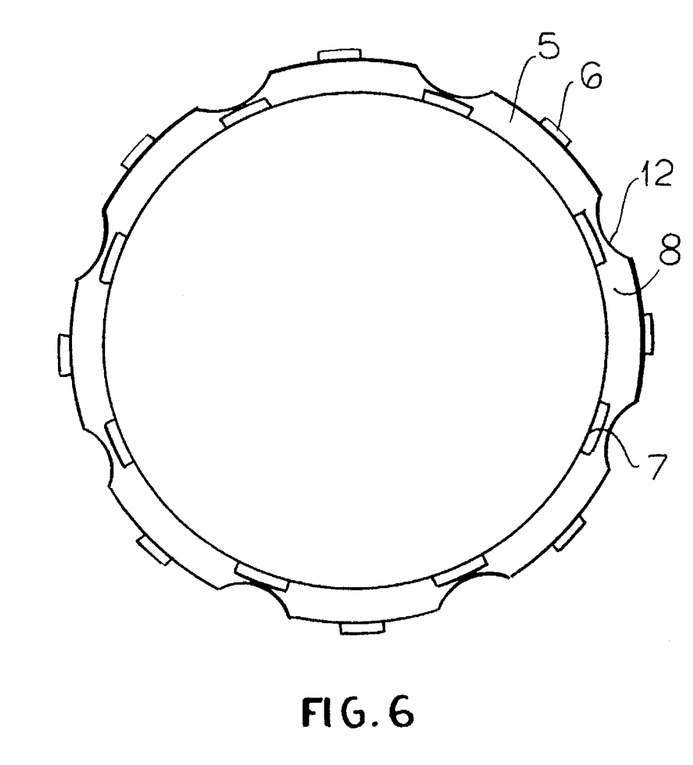
FIG. 6 is a plan view of an annular disk to be slipped onto an inner rotor.

FIG. 6 shows an annular disk 5 which, however, has no molded-on parts 10 and is not attached to the inner rotor 2 by means of screws or rivets, but is merely slipped onto the inner rotor 2.

Figure 7:
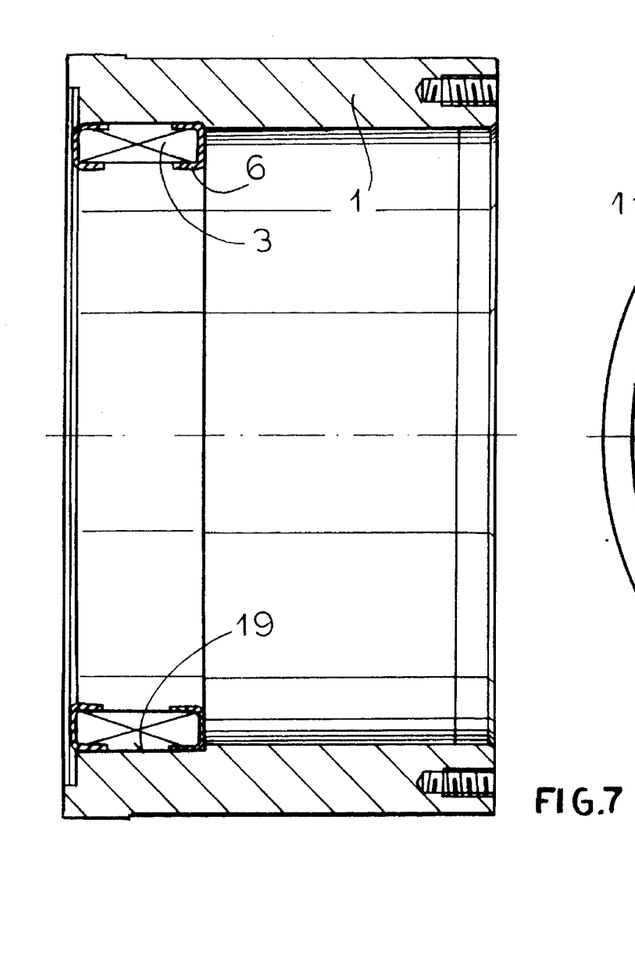
FIG. 7 is an axial section through an outer rotor.
Figure 8:
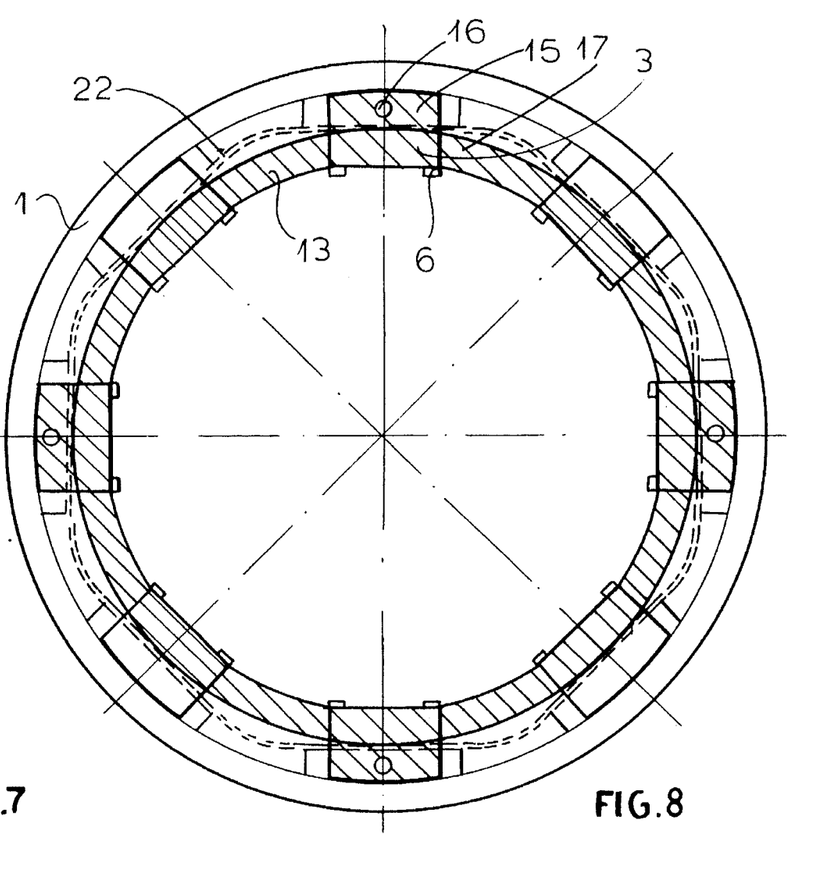
FIG. 8 is transverse cross-section of an outer rotor with magnets and corresponding annular disks.

FIGS. 7 and 8 show an outer rotor 1 on whose inner side the magnets 3 are retained or forced against bearing faces 19 by corresponding annular disks 13 and their molded-on lugs 6. Between the bearing faces 19 and the magnets 3 a bent strip of metal or sheet metal 22 can also be inserted which is flat in the one of the bearing faces 19, so that the magnets 3 on the strip 22 adhere thereto by their magnetic action during application and remain in position until the annular disks 13 are mounted. The annular disk 13 for the outer rotor 1 has straps 15 having openings 16 via which the annular disk 13 is attached to the outer rotor 1 by means off screws or rivets. In an embodiment which is not shown the annular disk 13 does not have any straps 15, so that the annular disk 13 is displaced backwards and forwards as required in the axial direction inside the outer rotor 1, so that a number of rows of magnets are attached to the inner side of the outer rotor 1. The magnets 3 are retained in position in the axial direction by the lateral face 17 of the annular disk 13.

FIG. 9 shows an inner rotor 2 on which two rows of magnets 4 are disposed. Disposed between the rows of magnets 4 are annular disks 5a which point away from one another by their lugs 6 and are each associated with a row of magnets 4.

Both the magnets 4 and the annular disks 5a are retained in position by the two outer annular disks 5, which are attached to the rotor 2 by means of screws or rivets 23.

Figure 10:
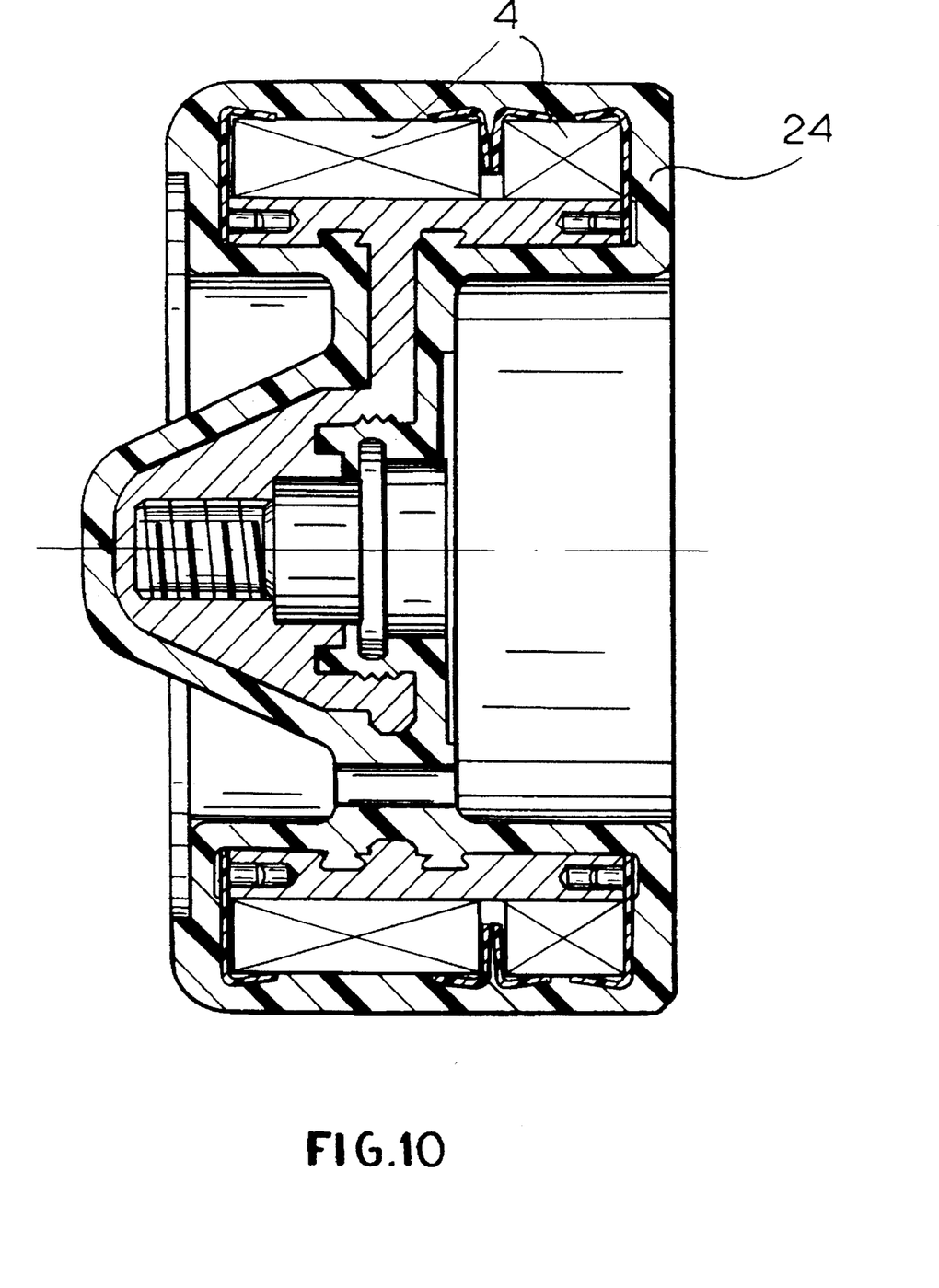
FIG. 10 is a cross section similar to FIG. 9 showing the rotor thereof with a plastic jacket.
Figure 11:
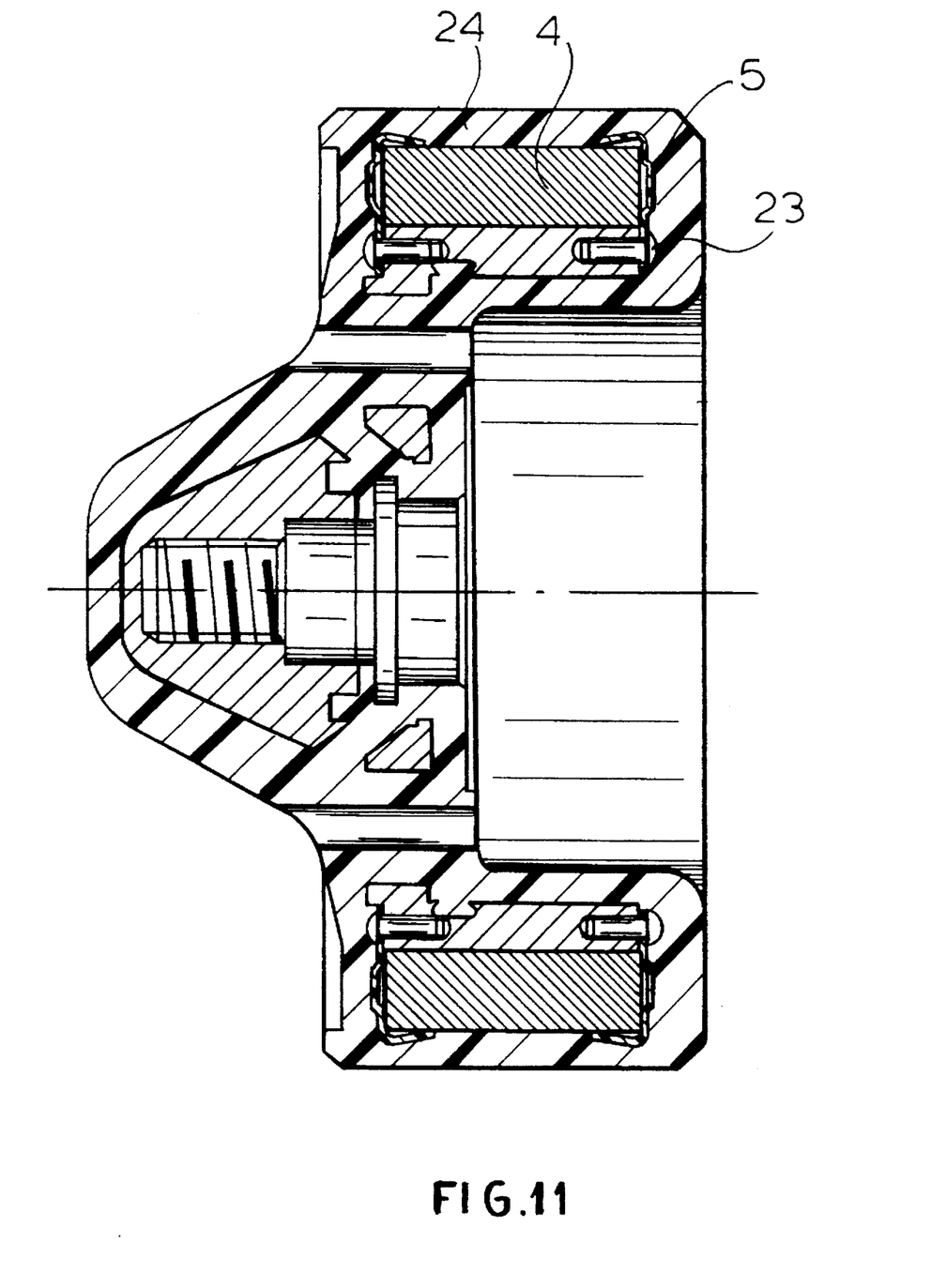
FIG. 11 is another cross section of a rotor with a plastic jacketing.

FIGS. 10 and 11 show rotors which are jacketed with plastic 24, the rotor illustrated in FIG. 10 having two rows of magnets 4.

I claim:

1. A magnetic clutch assembly for a pump comprising:

an inner rotor having a first plurality of rectangularly shaped magnets spaced uniformly in a circular first array about an outer periphery of said inner rotor and having respective bearing faces resting against the outer periphery of the inner rotor;

an outer rotor surrounding said inner rotor and having a second plurality of magnets in another circular array spaced around an inner periphery thereof in juxtaposition with the magnets of said inner rotor, whereby, upon rotation of said outer rotor said inner rotor is magnetically entrained in rotation about a common axis of said rotors; and retaining means for retaining said magnets at said rotors and including, for at least said inner rotor, a respective first thin annular disk on one axial side of said first array of said rectangularly shaped magnets and formed with a respective plurality of radially extending lugs having axial fingers engaging axially partially over the rectangularly shaped magnets of the first array along sides thereof remote from the inner rotor, and a respective second thin annular disk separate from the first annular disk on the opposite axial side of said first array and formed with a respective plurality of radially extending lugs having axial fingers engaging axially partially over the rectangularly shaded magnets of the first array along a side thereof remote from the inner rotor, said lugs of the annular disks of said inner rotor being dimensioned so that corners of the magnets thereof are at a greater radial distance from said axis than the corners of the lugs.

2. The magnetic clutch assembly defined in claim 1 wherein at least two lugs of a respective disk engage each magnet.

3. The magnetic clutch assembly defined in claim 1 wherein two coaxial disks bear oppositely against each magnet.

4. The magnetic clutch assembly defined in claim 1 wherein said lugs are S-shaped and resiliently press said magnets against bearing surfaces of said rotors against which said magnets lie.

5. The magnetic clutch assembly defined in claim 1 wherein said disk are formed with projections receiving between respective magnets and preferably positioning respective are S-shaped and resiliently press said magnets against bearing surfaces of said rotors against which said magnets lie.

6. The magnetic clutch assembly defined in claim 1 wherein an outer periphery of each of said disks is formed with recesses located between the respective magnets of the respective rotor enabling injection of plastic between said magnets.

7. The magnetic clutch assembly defined in claim 1 wherein said outer disks are composed of nonmagnetic material.

8. The magnetic clutch assembly defined in claim 1 wherein said disks are formed with openings adopted to receive screws or rivets for securing said disks to the respective rotors.

9. The magnetic clutch assembly defined in claim 1 wherein each of said rotors is formed with at least two rows of magnet, said assembly further comprising disks between rows of magnets of the respective rotor and end disks flanking the magnets of axially outermost rows.

10. The magnetic clutch assembly defined in claim 9 wherein a pair of disks are provided between rows of magnets with respective lugs turned in opposite directions.

11. The magnetic clutch assembly defined in claim 9 wherein the disks flanking outermost rows of magnets are provided with openings for receiving rivets or screws for securing said disks to the respective rotor.

12. The magnetic clutch assembly defined in claim 1 further comprising a plastic jacket injection molded round at least said inner rotor and the magnets and disks thereof.

* * * * *